United States Patent [19]

Park

[11] Patent Number: 5,762,864
[45] Date of Patent: Jun. 9, 1998

[54] LIGHTWEIGHT ARTIFICIAL AGGREGATE MANUFACTURING METHOD USING PAPER AND DYE SLUDGE

[75] Inventor: Yong Deuk Park, Taegu-si, Rep. of Korea

[73] Assignee: Gom Remicon Co., Ltd., Taegu-si, Rep. of Korea

[21] Appl. No.: 873,701

[22] Filed: Jun. 12, 1997

[30] Foreign Application Priority Data

Jun. 13, 1996 [KR] Rep. of Korea ............... 96-22209

[51] Int. Cl.$^6$ .................................................. C04B 35/64
[52] U.S. Cl. ......................... 264/646; 264/660; 264/661; 264/656; 501/155
[58] Field of Search ........................ 264/646, 660, 264/661, 656; 501/155

[56] References Cited

U.S. PATENT DOCUMENTS

| | | |
|---|---|---|
| 1,895,159 | 1/1933 | Greenwalt .................. 501/155 |
| 3,030,222 | 4/1962 | Eichenlaub ................. 501/155 |
| 4,112,033 | 9/1978 | Lingl ........................ 264/660 |
| 4,872,993 | 10/1989 | Harrison .................... 501/155 |
| 4,874,153 | 10/1989 | Hashimoto .................. 264/669 |
| 5,087,375 | 2/1992 | Weinwurm ................... 264/660 |

Primary Examiner—James Derrington
Attorney, Agent, or Firm—Jacobson, Price, Holman & Stern, PLLC

[57] ABSTRACT

A lightweight artificial aggregate manufacturing method includes the steps of: mixing aggregate sludge, whose moisture content exceeds 30%, with stone fragments, generated when pulverizing stone, to decrease the moisture content, mixing this mixture and sewage disposal plant sludge, which are dried and micro-pulverized, in a weight ratio of 50 to 50, and making the mixed sludge spheroids with a rotary plate molding device; applying paper sludge, which is dried and micro-pulverized, to the surface of the spheroids in order to prevent condensation of the spheroid during burning and to light the weight of aggregate; burning the spheroid with reducing flame of a temperature between 1000° C. and 1200° C. in a burning furnace, which uses gas or oil as fuel; and cooling the burned spheroid.

2 Claims, No Drawings

LIGHTWEIGHT ARTIFICIAL AGGREGATE MANUFACTURING METHOD USING PAPER AND DYE SLUDGE

BACKGROUND OF THE INVENTION

1. Field of the Invention

The present invention relates to a method for manufacturing lightweight artificial aggregate. Specifically, this invention is a method for manufacturing lightweight artificial aggregate with various industrial wastes such as sludge generated when washing aggregate, sludge generated from a sewage disposal plant, paper and dye sludge generated when processing paper and dye, and fragments generated when pulverizing stone aggregate, respectively.

2. Discussion of Related Art

It is difficult to dispose industrial wastes, such as paper/dye sludge, sludge generated from a sewage disposal plant or when washing aggregate. Because of expensive disposal costs and limited dumping ground, such industrial wastes are abandoned in the hills, resulting in environmental pollution. Proper countermeasure is required to solve this problem.

For the protection of environment, natural aggregate is supposed to be picked only in a specified area, thus causing lack of aggregate in rapidly increasing construction fields. Therefore, artificial aggregate replacing the natural aggregate is deeply required.

There is a conventional method for manufacturing artificial aggregate with sludge generated when washing aggregate. In this method, limestone or kaolin is applied to the surface of spheroid made of sludge to prevent the condensation of the spheroid during the burning process. However, it is difficult to collect, transport, or process limestone or kaolin, which is utilized as an application material in the conventional method. This increases the cost of the artificial aggregate. Therefore, new artificial aggregate manufacturing method using cheaper application materials instead of the limestone or kaolin, is necessary.

SUMMARY OF THE INVENTION

Accordingly, the present invention is directed to a lightweight artificial aggregate manufacturing method that substantially obviates one or more of the limitations and disadvantages of the related art.

An object of the present invention is to provide a method for manufacturing cheap and lightweight artificial aggregate using dye or paper sludge, which is industrial waste, as burning material of the artificial aggregate without using expensive materials such as limestone and kaolin, thereby solving the problem of lack of aggregate in various constructing sites, and preventing the environmental pollution.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof.

To achieve these and other advantages, and in accordance with the purpose of the present invention as embodied and broadly described, a lightweight artificial aggregate manufacturing method includes the steps of: mixing aggregate sludge, whose moisture content exceeds 30%, with stone fragments, generated when pulverizing stone, to decrease the moisture content, mixing this mixture and sewage disposal plant sludge, which are dried and micro-pulverized, in a weight ratio of 50 to 50, and making the mixed sludge spheroids with a rotary plate molding device; applying paper sludge, which is dried and micro-pulverized, to the surface of the spheroids in order to prevent condensation of the spheroid during burning and to light the weight of aggregate; burning the spheroid with reducing flame of a temperature between 1000° C. and 1200° C. in a burning furnace, which uses gas or oil as fuel; and cooling the burned spheroid.

It is to be understood that both the foregoing general description and the following detailed description are exemplary and explanatory and are intended to provide further explanation of the invention as claimed.

DETAILED DESCRIPTION OF PREFERRED EMBODIMENT

Reference will now be made in detail to the preferred embodiments of the present invention, examples of which are illustrated in the accompanying drawings.

The following is a preferred embodiment of the present invention.

Aggregate sludge and sewage disposal plant sludge, after being dried and micro-pulverized, are mixed in the ratio of 50 to 50, then made spheroids in a rotary plate molding device. The mixing ratio between the two kinds of sludge is based on their weight. Dried and micro-pulverized paper sludge is applied to the surface of the spheroid to prevent its condensation during burning. The spheroid is then put into a burning furnace and burned with reducing flame between 1000° C. and 2000° C. Gas or oil is utilized as fuel for the burning furnace. If the spheroid is cooled, the manufacturing process according to the present invention is completed.

In the above embodiment, the paper sludge is used as application material to prevent the condensation of the spheroid during the burning and to produce lightweight artificial aggregate, but dye sludge can be used instead of the paper sludge to accomplish the same effects.

The method according to the present invention uses dye or paper sludge as the application material to prevent the condensation of the spheroid during the burning and to produce the lightweight artificial aggregate, thereby decreasing the cost of production of the artificial aggregate, and disposing various industrial wastes efficiently and economically. The paper sludge generated when producing paper consists of inorganic matter of 40% and volatile organic matter of 60%. The organic matter of 60% is converted to gas during the burning, decreasing the specific gravity of artificial aggregate. The inorganic matter of 40%, which contains the same properties with kaolin or soil, has high fire-resistibility of "SK 1A (1100° C.)", thus making it possible to adjust the specific gravity of the spheroid in the minimum units of 0.5 g/cc during the sintering of the spheroid. Therefore, sub-lightweight artificial aggregate can be produced.

We examined the change of the specific gravity according to burning temperature for the paper and dye sludge which is used as the application material in the present invention and the limestone and kaolin which is used as application material in the conventional artificial aggregate manufacturing method. The result appears in the following TABLE 1.

The respective specific gravities of the paper and dye sludge were 0.53 g/cc and 0.7 g/cc at the temperature of 1100° C., which is the burning temperature for the artificial aggregate. Compared with the conventional application materials, or the limestone and kaolin, the specific gravities of the paper sludge and dye sludge are equal to them or rather lower at the same temperature.

TABLE 1

| Section | 1050° C.–1060° C. | 1070° C.–1080° C. | 1090° C.–1100° C. | Note |
|---|---|---|---|---|
| Paper sludge | 1.54 g/cc | 0.86 g/cc | 0.53 g/cc | |
| Dye sludge | 1.66 g/cc | 0.82 g/cc | 0.72 g/cc | |
| Limestone | 1.50 g/cc | 0.93 g/cc | 0.62 g/cc | condensed between 1090° C. and 1100° C. |
| Kaolin | 1.82 g/cc | 1.20 g/cc | 0.96 g/cc | condensed between 1090° C. and 1100° C. |

As described above, the present invention utilizes the dye and paper sludge, which is industrial waste, as burning material, thereby preventing environment from the industrial wastes and providing cheaper sub-lightweight artificial aggregate of high quality.

It will be apparent to those skilled in the art that various modifications and variations can be made in a lightweight artificial aggregate manufacturing method using dye and paper sludge according to the present invention without deviating from the spirit or scope of the invention. Thus, it is intended that the present invention cover the modifications and variations of this invention provided they come within the scope of the appended claims and their equivalents.

What is claimed is:

1. A lightweight artificial aggregate manufacturing method comprising the steps of:

mixing aggregate sludge, whose moisture content exceeds 30%, with stone fragments, generated by pulverizing stone, to decrease the moisture content of the aggregate sludge and prepare a first mixture, mixing the first mixture and sewage disposal plant sludge to prepare a second mixture, where the sludges are dried and micro-pulverized and used in a weight ratio of 50 to 50, and preparing mixed sludge spheroids from the second mixture with a rotary plate molding device;

applying paper sludge, which is dried and micro-pulverized, to the surface of the spheroids in order to prevent condensation of the spheroids during burning and to lighten the weight of aggregate;

burning the spheroids with a reducing flame at a temperature between 1000° C. and 1200° C. in a burning furnace, where gas or oil as fuel is used; and cooling the burned spheroids.

2. A lightweight artificial aggregate manufacturing method comprising the steps of:

mixing aggregate sludge, whose moisture content exceeds 30%, with stone fragments, generated by pulverizing stone, to decrease the moisture content of the aggregate sludge and prepare a first mixture, mixing the first mixture and sewage disposal plant sludge to prepare a second mixture, where the sludges are dried and micro-pulverized and used in a weight ratio of 50 to 50, and preparing mixed sludge spheroids from the second mixture with a rotary plate molding device;

applying dye sludge, which is dried and micro-pulverized, to the surface of the spheroids in order to prevent condensation of the spheroids during burning and to lighten the weight of aggregate;

burning the spheroids with a reducing flame at a temperature between 1000° C. and 1200° C. in a burning furnace, where gas or oil as fuel is used; and cooling the burned spheroids.

* * * * *